H. TEN WINKEL.
WET WEATHER GUARD AND ANTIRATTLER FOR AUTOMOBILES.
APPLICATION FILED JULY 12, 1920.
1,409,269.
Patented Mar. 14, 1922.
2 SHEETS—SHEET 1.
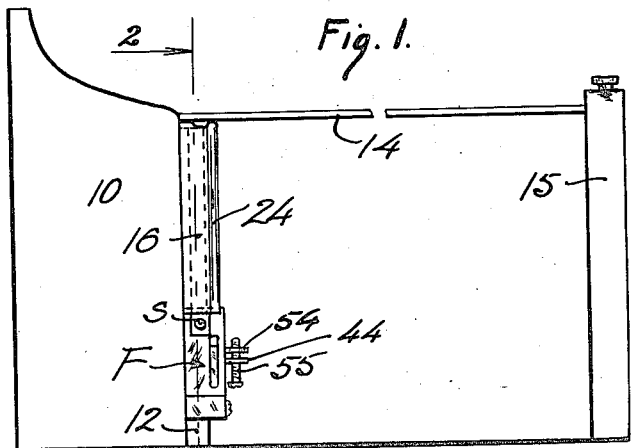
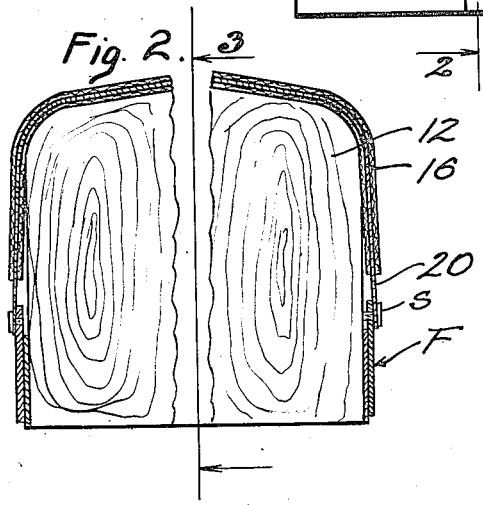
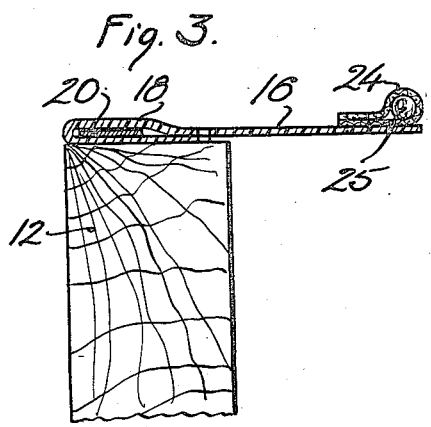
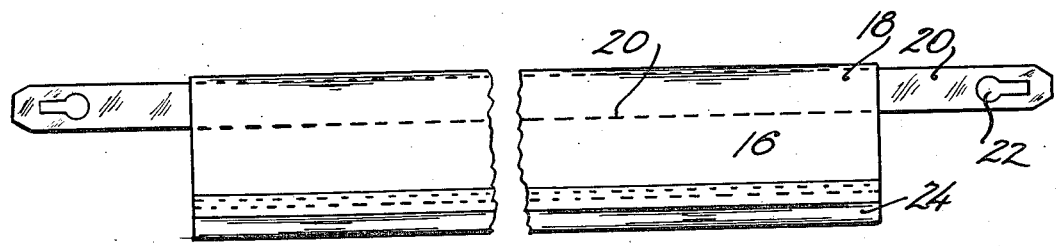
Inventor
H. Ten Winkel.
By  J. O'Brien
Attorney H. TEN WINKEL.
WET WEATHER GUARD AND ANTIRATTLER FOR AUTOMOBILES.
APPLICATION FILED JULY 12, 1920.
1,409,269.
Patented Mar. 14, 1922.
2 SHEETS—SHEET 2.
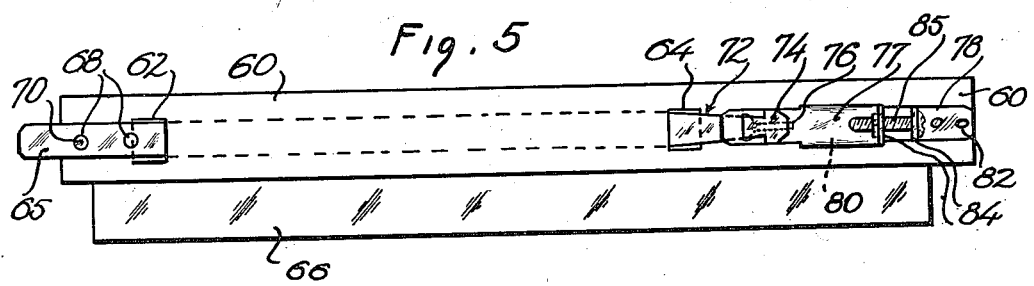
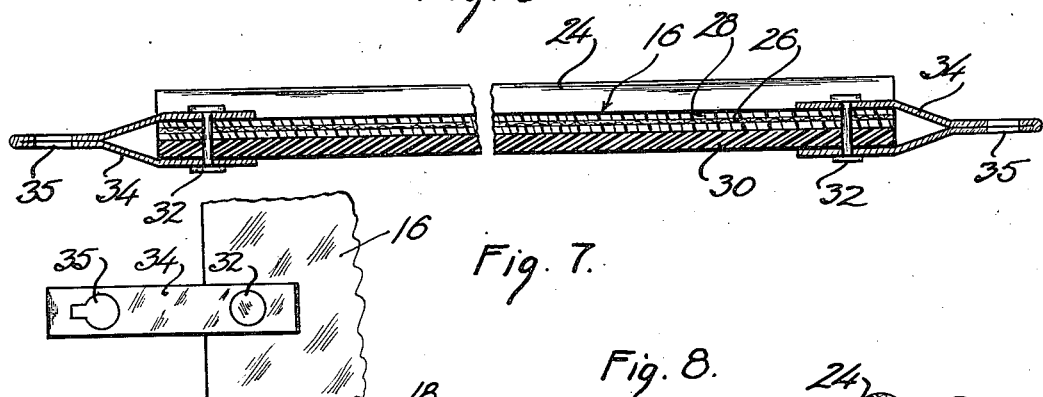
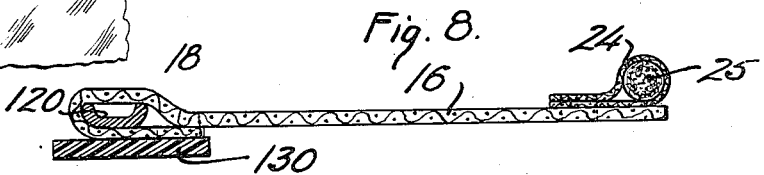
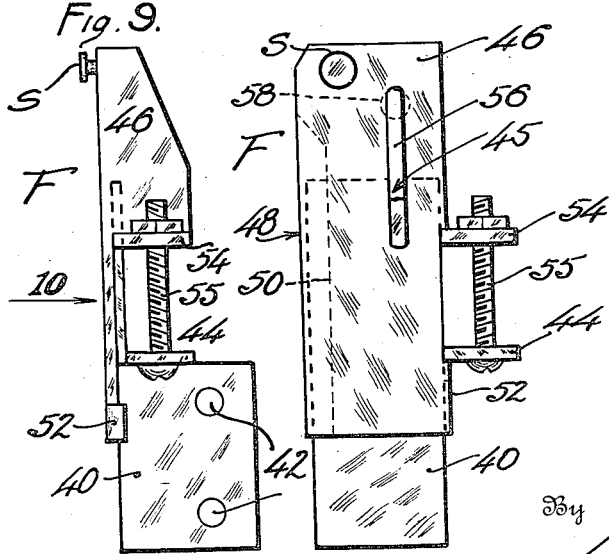
H. Ten Winkel, Inventor

UNITED STATES PATENT OFFICE.

HERMAN TEN WINKEL, OF DENVER, COLORADO.

WET-WEATHER GUARD AND ANTIRATTLER FOR AUTOMOBILES.

1,409,269.  Specification of Letters Patent.  Patented Mar. 14, 1922.

Application filed July 12, 1920. Serial No. 395,675.

*To all whom it may concern:*

Be it known that I, HERMAN TEN WINKEL, a citizen of the United States, residing at the city and county of Denver and State of Colorado, have invented certain new and useful Improvements in Wet-Weather Guards and Antirattlers for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

The object of this invention is to provide means for an attachment to the dashboard of an automobile on which the rear end of the hood may rest, and which may be made to serve as an anti-rattling device or as a seal to keep out water, or for both purposes, according to conditions.

Briefly, the invention comprises a flexible strip having means for attaching its ends to the lower side portions of the dashboard, and provided with compressible parts which cushion the hood to prevent rattling and to keep out water. The flexible member may be provided with a flexible strip to bear against the cowl to provide the seal, and may be provided at the opposite or forward edge with a ribbed part to interrupt the passage of water forward, and deflect it downward over the sides of the flexible member.

In the drawings:

Fig. 1 represents the device in use.

Fig. 2 is a section taken on line 2—2 of Fig. 1.

Fig. 3 is a view on line 3—3 of Fig. 2.

Fig. 4 is a plan of the flexible member.

Fig. 5 is a plan of a modified form.

Fig. 6 is a longitudinal section through a further modified form.

Fig. 7 is a detail of the fastening means used in Fig. 6.

Fig. 8 is a cross section through a further modification.

Fig. 9 is an elevation of the adjustable fastening device which is secured to the lower side portions of the dashboard and to which the flexible member is connected.

Fig. 10 is an elevation represented by arrow 10 of Fig. 9.

The cowl 10, dashboard 12, hood 14 and radiator 15 of the usual automobile are represented diagrammatically. At the lower side portions of the dashboard 12, fastening means F are secured, these means being provided with studs S in the form of flexible means, shown in Figs. 1 to 4. A sheet 16 is employed, which is folded to provide a longitudinally extending pocket 18, which receives a longitudinally extending metal strip 20 provided with keyhole slots 22, passed over the studs S. The edge of the sheet 16 has a fabric pocket 24 stitched thereto, and extending longitudinally thereof, which contains a large cord or other suitable device 25, whereby a rib is formed on the upper side of the forward edge of said sheet 16. When placed in position on the upper edge of the dash 12, the pocket 18 fills the space between the hood 14 and said dash 12 when the hood is secured in position as usual. This prevents the passage of water along the top of the dash, and also serves to prevent rattling. In the event that water should pass along the top of the sheet 16, it will be interrupted in its forward path by the rib at 25, and be deflected down to the sides of the member so that the water can not flow down to the forward face of the dash 12 and soak the ignition parts.

In the form shown in Fig. 6, the sheet 16 is composed of a fabric 26 having rubber faces 28, the forward edge of the device being provided with a rib at 24, as in the form shown in Fig. 3. A longitudinally extending rubber strip 30 is secured beneath the rear edge of the sheet 16 by means of rivets 32, which also secure the clip 34 with its legs on opposite sides of the member, said clip being provided with a keyhole slot 35 for attaching purposes.

The form of Fig. 8 shows the parts in form similar to that of Fig. 3, except that the metal strip 120 is curved in order to make a tighter fit between the dash and the hood when in operative position. The underside of the rear edge is also provided with a longitudinally extending rubber strip 130, corresponding to the rubber strip 30 of Fig. 6, for the purpose of assisting in the production of a tighter joint where required. In this form the rib at 24, 25, is the same as in Fig. 3.

The fastening devices F are shown in detail in Figs. 9 and 10. These comprise a pair of right-angled plates 40, provided with screw holes 42 for securing them to the dash 12, the portion of each plate 40 which carries the screw holes 42 lying on the forward face of the dash. This forward face is provided with an integral, forwardly-extending ear 44, while the other face extends higher and is provided with a notch indicated at 45. A second right-angled plate 46 has the rear edge 48 of its side face rolled around the rear edge of the side face of plate 40 to provide a guiding channel as indicated in dotted lines 50. The lower end of the side face of plate 46 has a tongue 52, bent around to engage the forward face of plate 40 for guiding purposes, this tongue also engaging the under side of ear 44 to limit upward movement. The forward face of plate 46 is provided with an integral ear 54, lying directly above ear 44, said two ears being provided with a screw 55 for drawing the upper plate 46 downward. The notch 45 in plate 40 cooperates with a slot 56 in plate 46, a screw, indicated in dotted lines 58, being passed through slot 56 at its upper end and threaded into the dash 12. When the plates are in collapsed condition the notch 45 will receive said screw.

The plate 40 will first be secured to the dash in the operation of installing the present invention. The screw 55 will be unthreaded to raise the stud S in the upper end of the movable plate 46 so that the slots 22 or 35, as the case may be, may receive said studs S. When the flexible member 16 is properly positioned, the screws 55 on each side of the dash are tightened in order to stretch both ends of said flexible member 16 to produce a snug fit upon the top of said dash. In some cars it is necessary, in order to prevent water from leaking into the ignition parts, that a strip be fitted snugly against the forward portion of the cowl 10, and in such event either the rear edge of the pocket 18 may be so fitted, or the rear edge of the rubber strips 30 or 130 may be so fitted. In this manner, when the hood 14 is fixed in normal operative position, the leaking of water to the ignition parts will be effectually prevented.

The form of Fig. 5 shows an anti-rattling construction which consists of a metal plate 60 having a hole 62 adjacent one end, and a hole 64 toward the other end. These holes receive the ends of a metal strip 65, to which, on its outer face, there is secured a rubber or other flexible sheet 66, as by a pocket (not shown) corresponding to pocket 18 of the other forms, which receives the metal strip 65. The end of said strip 65 which passes through hole 62 is provided with a pair of openings 68 either of which may be passed over a stud 70 in said plate 60. The opposite end of said strip 65 is reduced as indicated at 72, and provided at its tip with a head 74, which passes through a T-slot 76 in a movable piece 77, guided on a strip 78 by means of guides formed by rolling over the sides around the strip 78, as indicated at 80. The strip 78 is secured by rivets or bolts 82 to the plate 60. Each of strips 77 and 78 is provided with an upstanding ear 84, through which a screw 85 passes for the purpose of tightening the parts.

This last modification is designed particularly for that type of machine in which the cowl extends somewhat forward of the dash. In this case the upper edge of the plate 60 as seen in Fig. 5 will be secured with the cowl in any suitable manner, with the flexible member 66 projecting forward. Or, said projecting portion of the cowl may have holes cut into it corresponding to the holes 62 and 64, the strip 68 being riveted or bolted thereto. In this event, the plate 60 may be considered to represent said projecting cowl portion. This will effectually prevent rattling of the hood when secured in operative position.

I claim:

1. A device adapted to be placed between the dash and the hood of an automobile comprising a flexible comparatively narrow strip, a water diverting rib on said strip and adjustable means adapted to be secured to one side of the dash to tighten said strip.

2. A device adapted to be placed between the dash and the hood of an automobile comprising a flexible strip, and adjustable means adapted to be secured to one side of the dash to tighten said strip, said strip having an overhanging portion, and a water diverting rib on the edge of the overhanging portion.

3. A device adapted to be placed between the dash and the hood of an automobile comprising a flexible strip, one edge of said strip being adapted to overhang, and having a water diverting rib on its upper face and means for adjustably holding said strip against the dash.

4. A device comprising a strip having one edge adapted to be placed between the dash and the hood of an automobile, a water diverting rib on the upper face of the other edge, and an adjustable fastening element adapted to be secured to the dash and connected to the strip at one end to stretch the same.

5. A device comprising a strip having one edge adapted to be placed between the dash and the hood of an automobile, a water diverting rib on the upper face of the other edge, an adjustable fastening element adapted to be secured to the dash and connected to the strip at one end to stretch the same, said element comprising one plate movable on another, and means for drawing one plate toward the other.

In testimony whereof I affix my signature.

HERMAN TEN WINKEL.